United States Patent
Li et al.

(10) Patent No.: US 11,577,967 B2
(45) Date of Patent: *Feb. 14, 2023

(54) TUNGSTEN PENTACHLORIDE CONDITIONING AND CRYSTALLINE PHASE MANIPULATION

(71) Applicant: L'Air Liquide, Société Anonyme pour l'Etude et l'Exploitation des Procédés Georges Claude, Paris (FR)

(72) Inventors: Feng Li, San Jose, CA (US); Sonia Plaza, Eschirolles (FR); Jean-Marc Girard, Versailles (FR); Nicolas Blasco, Grenoble (FR); Yumin Liu, San Jose, CA (US)

(73) Assignee: L'Air Liquide Société ANonyme pour l'Etude et l'Exploitation des Procédés Georges Claude, Paris (FR)

(*) Notice: Subject to any disclaimer, the term of this patent is extended or adjusted under 35 U.S.C. 154(b) by 238 days.

This patent is subject to a terminal disclaimer.

(21) Appl. No.: 17/123,445

(22) Filed: Dec. 16, 2020

(65) Prior Publication Data

US 2021/0114894 A1 Apr. 22, 2021

Related U.S. Application Data

(60) Division of application No. 16/144,000, filed on Sep. 27, 2018, now Pat. No. 10,899,630, which is a continuation-in-part of application No. 15/966,924, filed on Apr. 30, 2018, now Pat. No. 10,710,896.

(51) Int. Cl.
*C01G 41/04* (2006.01)

(52) U.S. Cl.
CPC .......... *C01G 41/04* (2013.01); *C01P 2002/72* (2013.01)

(58) Field of Classification Search
CPC .................... C01G 41/04; C01P 2002/70
See application file for complete search history.

(56) References Cited

U.S. PATENT DOCUMENTS

| 7,141,095 | B2 | 11/2006 | Aitchison et al. |
| 7,641,886 | B2 | 1/2010 | Tenne et al. |
| 9,219,009 | B2 | 12/2015 | Lai et al. |
| 9,230,815 | B2 | 1/2016 | Fu et al. |
| 9,595,470 | B2 | 3/2017 | Bamnolker et al. |
| 9,601,339 | B2 | 3/2017 | Fu et al. |
| 11,066,310 | B2 * | 7/2021 | Li .......................... C01G 41/04 |

(Continued)

FOREIGN PATENT DOCUMENTS

| JP | 2017 239342 | 12/2017 |
| JP | 2019 7073 | 1/2019 |

(Continued)

OTHER PUBLICATIONS

Cordfunke, E.H.P. et al., The vapour pressure of $WCl_6$, J. Chem .Thermodynamics 1992, 24, 329-331.

(Continued)

*Primary Examiner* — Ngoc-Yen Nguyen
(74) *Attorney, Agent, or Firm* — Allen E. White

(57) ABSTRACT

A process of conditioning tungsten pentachloride to form specific crystalline phases are disclosed. The specific crystalline phases permit stable vapor pressures over extended periods of time during vapor deposition and etching processes.

4 Claims, 5 Drawing Sheets

(56) References Cited

U.S. PATENT DOCUMENTS

| | | |
|---|---|---|
| 2003/0190424 A1 | 10/2003 | Sneh |
| 2009/0181168 A1 | 7/2009 | Chaubey et al. |
| 2016/0305020 A1 | 10/2016 | Wu et al. |
| 2017/0335450 A1 | 11/2017 | Collins et al. |
| 2017/0350013 A1 | 12/2017 | Chan et al. |

FOREIGN PATENT DOCUMENTS

| | | |
|---|---|---|
| KR | 10 2016 0124032 | 10/2016 |
| WO | WO 2017 075172 | 5/2017 |
| WO | WO 2017 130745 | 8/2017 |
| WO | WO 2019 115361 | 6/2019 |

OTHER PUBLICATIONS

Cotton, F.A. et al., Tungsten pentacholoride, Acta Cryst. (1978) B34, 2833-2834.

Drobot, D.V. et al., Equilibrium diagram of the $WC_4$—$WCl_6$ system, Russian Journal of Inorganic Chemistry 22 (8) 1977, 1217-1218.

Drobot, D.V. et al., Phase equilibria in the tungsten-chlorine-oxygen system, Russian Journal of Inorganic Chemistry, 22 (7) 1977, 1062-1064.

Enghag, P. et al., Thermodynamic properties of $WOCl_4$, Acta Chemica Scandivanica 26 (1972), 1067-1072.

Okamoto, H., Cl—W, Journal of Phase Equilibria and Diffusion, vol. 31, No. 4 (2010), 402-403.

Plante, E.R. et al., Vapor pressure and heat of sublimation of tungsten, Journal of Research of the National Bureau of Standards, Section A, Physics and Chemistry, 1973, vol. 77A, No. 2, Mar.-Apr. 1973, 237-242.

International Search Report and Written Opinion for corresponding PCT/US2019/029970, dated Aug. 8, 2019.

International Search Report and Written Opinion for related PCT/US2019/029969, dated Aug. 14, 2019.

\* cited by examiner

TUNGSTEN PENTACHLORIDE CONDITIONING AND CRYSTALLINE PHASE MANIPULATION

CROSS REFERENCE TO RELATED APPLICATIONS

The present application divisional of U.S. patent application Ser. No. 16/144,000, filed, Sep. 27, 2018, which is a continuation-in-part of U.S. patent application Ser. No. 15/966,924 filed Apr. 30, 2018, herein incorporated by reference in its entirety for all purposes.

TECHNICAL FIELD

Processes of conditioning tungsten pentachloride to form specific crystalline phases are disclosed. The specific crystalline phases permit stable vapor pressures over extended periods of time during vapor deposition and etching processes.

BACKGROUND $WCl_5$ has attracted interest as CVD or ALD materials used to deposit W-containing films, such as W metal; $WSi_2$; $WX_2$, in which X is S, Se, or Te; W-doped amorphous Carbon, $WO_3$, etc. (see, e.g., U.S. Pat. Nos. 9,595,470; 9,230,815, and 7,641,886 and US Pat App Pub Nos. 2003/190424 and 2017/350013).

The crystal structure of $WCl_5$ has been reported in Acta Crystallogr. (1978) B34, pp. 2833-2834. Its powder X-ray diffraction pattern was collected as International Centre for Diffraction Data Powder Diffraction File (PDF) card #04-005-4302. Okamoto reported the W-Cl phase diagram. Journal of Phase Equilibria and Diffusion, Vol. 31, No. 4 (2010).

WO2017/130745 to JX Nippon Mining & Metals Corp discloses a high purity tungsten pentachloride synthesis method.

WO2017/075172 to L'Air Liquide, Societe Anyonyme pour l'Etude et l'Exploitation des Procedes Georges Claudes discloses a vessel having internally wettable surface therein coated with one or more barrier layers to, for example, inhibit contamination of a material, such as a metal halide, contained in the vessel.

$WCl_5$ suffers from being a solid, low vapor pressure precursor. Providing a sufficient flux to the processing chamber from a solid, low pressure precursor like $WCl_5$ is difficult. Another challenge is to maintain a stable flux of precursor as the $WCl_5$ containing package is being depleted. Both aspects are common to all solids, and may be addressed by using solid-specific packaging (see, e.g., US Pat App Pub Nos. 2009/0181168 and 2017/0335450).

A need remains to supply a stable and reproducible flux of $WCl_5$ vapors to a vapor deposition or etching process chamber over extended periods of time.

SUMMARY

Disclosed are methods of conditioning $WCl_5$ to produce $WCl_5$-containing compositions comprising a crystalline phase having approximately 10% by weight to approximately 40% by weight of Phase 1 $WCl_5$ as determined by X-ray diffraction. A container of $WCl_5$ is heated to a temperature ranging from approximately 190° C. to 245° C. for a time period ranging from approximately 2 hours to approximately 48 hours. The disclosed methods may include one or more of the following aspects:

purifying the $WCl_5$ prior to conditioning;
purifying the $WCl_5$ prior to heating;
the container being selected to be non-reactive to $WCl_5$;
the container being glass;
the container being a glass-coated container;
the container being sealed;
the container designed to prevent direct contact between $WCl_5$ and stainless steel;
the time period ranging from approximately 24 hours to approximately 48 hours;
the time period ranging from approximately 40 hours to approximately 48 hours;
the temperature ranging from approximately 205° C. to 240° C.;
the temperature ranging from approximately 215° C. to 235° C.;
the $WCl_5$ comprising both crystalline and amorphous phases;
the $WCl_5$ comprising approximately 50% w/w to approximately 70% w/w of an amorphous phase;
the $WCl_5$ comprising approximately 55% w/w to approximately 65% w/w of an amorphous phase;
the $WCl_5$-containing composition comprising both crystalline and amorphous phases;
the $WCl_5$-containing composition comprising approximately 30% w/w to approximately 55% w/w of an amorphous phase;
the $WCl_5$-containing composition comprising approximately 40% w/w to approximately 50% w/w of an amorphous phase;
the crystalline phase of the $WCl_5$-containing composition comprising approximately 10% w/w to approximately 35% w/w of Phase 1 $WCl_5$;
the crystalline phase of the $WCl_5$-containing composition comprising approximately 10% w/w to approximately 30% w/w of Phase 1 $WCl_5$;
the crystalline phase of the $WCl_5$-containing composition comprising approximately 10% w/w to approximately 25% w/w of Phase 1 $WCl_5$;
the crystalline phase of the $WCl_5$-containing composition comprising approximately 65% w/w to approximately 90% w/w of Phase 2 $WCl_5$;
the crystalline phase of the $WCl_5$-containing composition comprising approximately 70% w/w to approximately 90% w/w of Phase 2 $WCl_5$;
the crystalline phase of the $WCl_5$-containing composition comprising approximately 75% w/w to approximately 90% w/w of Phase 2 $WCl_5$;
the crystalline phase of the $WCl_5$-containing composition comprising approximately 10% w/w to approximately 35% w/w of Phase 1 WCls and approximately 65% w/w to approximately 90% w/w of Phase 2 $WCl_5$;
the crystalline phase of the $WCl_5$-containing composition comprising approximately 10% w/w to approximately 30% w/w of Phase 1 $WCl_5$ and approximately 70% w/w to approximately 90% w/w of Phase 2 $WCl_5$; and/or
the crystalline phase of the $WCl_5$-containing composition comprising approximately 10% w/w to approximately 25% w/w of Phase 1 $WCl_5$ and approximately 75% w/w to approximately 90% w/w of Phase 2 $WCl_5$.

Also disclosed are $WCl_5$-containing compositions conditioned by the methods disclosed above. The $WCl_5$-containing compositions comprise approximately 30% by weight to approximately 55% by weight of an amorphous phase and approximately 45% by weight to approximately 70% by weight of a crystalline phase, with approximately 10% by weight to approximately 40% by weight of the crystalline phase comprising Phase 1 WCl$_5$ as determined by X-ray diffraction. The disclosed WCl$_5$-containing compositions may contain one or more of the following aspects:

the WCl$_5$-containing composition comprising approximately 40% w/w to approximately 50% w/w of the amorphous phase;

the WCl$_5$-containing composition comprising approximately 50% w/w to approximately 60% w/w of the crystalline phase;

the crystalline phase of the WCl$_5$-containing composition having approximately 10% weight to approximately 35% weight of Phase 1 VVCl$_5$;

the crystalline phase of the WCl$_5$-containing composition having approximately 10% weight to approximately 30% weight of Phase 1 WCl$_5$;

the crystalline phase of the WCl$_5$-containing composition having approximately 10% weight to approximately 25% weight of Phase 1 WCl$_5$;

the crystalline phase of the WCl$_5$-containing composition comprising approximately 65% w/w to approximately 90% w/w of Phase 2 WCl$_5$;

the crystalline phase of the WCl$_5$-containing composition comprising approximately 70% w/w to approximately 90% w/w of Phase 2 WCl$_5$;

the crystalline phase of the WCl$_5$-containing composition comprising approximately 75% w/w to approximately 90% w/w of Phase 2 WCl$_5$;

the crystalline phase of the WCl$_5$-containing composition comprising approximately 10% w/w to approximately 35% wlw of Phase 1 WCl$_5$ and approximately 65% w/w to approximately 90% w/w of Phase 2 WCl$_5$;

the crystalline phase of the WCl$_5$-containing composition comprising approximately 10% w/w to approximately 30% w/w of Phase 1 WCl$_5$ and approximately 70% w/w to approximately 90% w/w of Phase 2 WCl$_5$; and/or the crystalline phase of the WCl$_5$-containing composition comprising approximately 10% w/w to approximately 25% w/w of Phase 1 WCl$_5$ and approximately 75% w/w to approximately 90% w/w of Phase 2 WCls.

Also disclosed are WCl$_5$-containing composition delivery devices comprising a canister having an inlet conduit and an outlet conduit and containing any of the WCl$_5$-containing compositions disclosed above. The disclosed delivery devices may include one or more of the following aspects:

the WCl$_5$-containing composition comprising approximately 30% w/w to approximately 55% w/w of the amorphous phase;

the WCl$_5$-containing composition comprising approximately 40% w/w to approximately 50% w/w of the amorphous phase;

the WCl$_5$-containing composition comprising approximately 45% w/w to approximately 70% w/w of the crystalline phase;

the WCl$_5$-containing composition comprising approximately 50% w/lw to approximately 60% w/w of the crystalline phase;

the crystalline phase of the WCl$_5$-containing composition having approximately 10% weight to approximately 35% of Phase 1 WCl$_5$;

the crystalline phase of the WCl$_5$-containing composition having approximately 10% weight to approximately 30% weight of Phase 1 WCl$_5$;

the crystalline phase of the WCl$_5$-containing composition having approximately 10% weight to approximately 25% weight of Phase 1 WCl$_5$;

the crystalline phase of the WCl$_5$-containing composition comprising approximately 65% w/w to approximately 90% w/w of Phase 2 WCl$_5$;

the crystalline phase of the WCl$_5$-containing composition comprising approximately 70% w/w to approximately 90% w/w of Phase 2 WCl$_5$;

the crystalline phase of the WCl$_5$-containing composition comprising approximately 75% w/w to approximately 90% w/w of Phase 2 WCl$_5$;

the crystalline phase of the WCl$_5$-containing composition comprising approximately 10% w/w to approximately 35% w/w of Phase 1 WCl$_5$ and approximately 65% w/w to approximately 90% w/w of Phase 2 WCl$_5$;

the crystalline phase of the WCl$_5$-containing composition comprising approximately 10% w/w to approximately 30% w/w of Phase 1 WCl$_5$ and approximately 70% w/w to approximately 90% w/w of Phase 2 WCl$_5$; and/or the crystalline phase of the WCl$_5$-containing composition comprising approximately 10% w/w to approximately 25% w/w of Phase 1 WCl$_5$ and approximately 75% w/w to approximately 90% w/w of Phase 2 WCl$_5$.

Also disclosed are methods of providing a stable vapor pressure of WCl$_5$ over a time period by subliming a WCl$_5$-containing composition comprising a crystalline phase having approximately 10% weight to approximately 40% weight of Phase 1 WCl$_5$ as determined by X-ray diffraction. The WCl$_5$-containing compositions conditioned by the methods disclosed above is introduced into a solid precursor vaporizer. The solid precursor vaporizer is connected to the semiconductor processing chamber and heated to a vaporizing temperature for the time period to deliver a steady supply of WCl$_5$ vapor. The disclosed methods may include one or more of the following aspects:

the vaporizing temperature ranging from approximately 100° C. to approximately 150° C.;

the time period ranging from approximately 60 minutes to approximately 8 hours;

the time period ranging from approximately 8 hours to approximately 24 hours the time period ranging from approximately 24 hours to approximately 48 hours;

the time period ranging from approximately 40 hours to approximately 48 hours;

the WCl$_5$-containing composition comprising approximately 30% w/w to approximately 55% w/w of the amorphous phase;

the WCl$_5$-containing composition comprising approximately 40% w/w to approximately 50% w/w of the amorphous phase;

the WCl$_5$-containing composition comprising approximately 45% w/w to approximately 70% w/w of the crystalline phase;

the WCl$_5$-containing composition comprising approximately 50% w/w to approximately 60% w/w of the crystalline phase;

the crystalline phase of the WCl$_5$-containing composition comprising approximately 10% weight to approximately 35% weight of Phase 1 WCl$_5$;

the crystalline phase of the WCl$_5$-containing composition comprising approximately 10% weight to approximately 30% weight of Phase 1 WCl$_5$;

the crystalline phase of the WCl$_5$-containing composition comprising approximately 10% weight to approximately 25% weight of Phase 1 WCl$_5$;

the crystalline phase of the $WCl_5$-containing composition comprising approximately 65% w/w to approximately 90% w/w of Phase 2 $WCl_5$;

the crystalline phase of the $WCl_5$-containing composition comprising approximately 70% w/w to approximately 90% w/w of Phase 2 $WCl_5$;

the crystalline phase of the $WCl_5$-containing composition comprising approximately 75% w/w to approximately 90% w/w of Phase 2 $WCl_5$;

the crystalline phase of the $WCl_5$-containing composition comprising approximately 10% w/w to approximately 35% w/w of Phase 1 $WCl_5$ and approximately 65% w/w to approximately 90% w/w of Phase 2 $WCl_5$;

the crystalline phase of the $WCl_5$-containing composition comprising approximately 10% w/w to approximately 30% w/w of Phase 1 $WCl_5$ and approximately 70% w/w to approximately 90% w/w of Phase 2 $WCl_5$;

the crystalline phase of the $WCl_5$-containing composition comprising approximately 10% w/w to approximately 25% w/w of Phase 1 $WCl_5$ and approximately 75% w/w to approximately 90% w/w of Phase 2 $WCl_5$;

the $WCl_5$-containing composition maintaining approximately 80% of the initial vapor pressure of $WCl_5$ at the vaporizing temperature after approximately 75% w/w of the $WCl_5$-containing composition has been consumed;

the $WCl_5$-containing composition maintaining approximately 90% of the initial vapor pressure of $WCl_5$ at the vaporizing temperature after approximately 75% w/w of the $WCl_5$-containing composition has been consumed; and/or the $WCl_5$-containing composition maintaining approximately 95% of the initial vapor pressure of $WCl_5$ at the vaporizing temperature after approximately 75% w/w of the $WCl_5$-containing composition has been consumed.

NOTATION AND NOMENCLATURE

Certain abbreviations, symbols, and terms are used throughout the following description and claims, and include:

As used herein, the indefinite article "a" or "an" means one or more.

As used herein, the terms "approximately" or "about" mean±10% of the value stated.

As used herein, the term "comprising" is inclusive or open-ended and does not exclude additional, unrecited materials or method steps; the term "consisting essentially of" limits the scope of a claim to the specified materials or steps and additional materials or steps that do not materially affect the basic and novel characteristics of the claimed invention; and the term "consisting of" excludes any additional materials or method steps not specified in the claim.

As used herein, the abbreviation "RT" means room temperature or a temperature ranging from approximately 18° C. to approximately 25° C.

As used herein, the abbreviation "XRD" means X-Ray Diffraction and "PXRD" means Powder X-Ray Diffraction.

As used herein, the abbreviation "ALD" means Atomic Layer Deposition and the abbreviation "CVD" means Chemical Vapor Deposition.

As used herein, the terms "sublime," "sublimation," and/or "subliming" refer to the process of converting a solid to a gas for use in a vapor deposition or etching processes. One of ordinary skill in the art will recognize that solid materials are frequently purified by a process that is also called "sublimation." However, the sublimation purification process includes a cold finger or trap on which the purified material condenses. Applicants have tried to distinguish the two terms throughout the specification and claims by adding the term "purification" or "purify" to the sublimation purification disclosures. In other words, "sublime," "sublimation," and/or "subliming" means converting a solid to a gas and "sublimation purification" means converting a solid to a gas and capturing the purified solid in a cold trap, except in the purification examples 1 and 2, in which sublimation purification is sometimes referred to simply as sublimation as should be well understood by the context.

As used herein, any reference to $WCl_5$ includes the monomeric $WCl_5$, the dimeric $W_2Cl_{10}$, and combinations thereof.

The standard abbreviations of the elements from the periodic table of elements are used herein. It should be understood that elements may be referred to by these abbreviations (e.g., W refers to tungsten, Si refers to silicon, C refers to carbon, etc.).

Any and all ranges recited herein are inclusive of their endpoints (i.e., x=1 to 4 or x ranges from 1 to 4 includes x=1, x=4, and x=any number in between), irrespective of whether the term "inclusively" is used.

BRIEF DESCRIPTION OF THE FIGURES

For a further understanding of the nature and objects of the present invention, reference should be made to the following detailed description, taken in conjunction with the accompanying figures wherein.

DESCRIPTION OF PREFERRED EMBODIMENTS

Applicants have discovered that the sublimation rate from $WCl_5$ subject to normal industrial sublimation conditions gradually decreases, leading to performance drift in processes that utilize $WCl_5$ vapors. In other words, the process rate (i.e., deposition or etching rate) using a new canister is faster than the process rate after a portion of the same canister has been used.

$WCl_5$ comprises both crystalline and amorphous phases. The amorphous phase acts like a liquid. As a result, the vapor pressure of $WCl_5$ contributed by the amorphous phase remains constant. Further analysis demonstrates that the change in process performance is due to the change in the relative fraction of the two crystalline phases of $WCl_5$. More particularly, as shown in Example 1, the crystalline phase of freshly purified $WCl_5$ tends to comprise greater than 95% of one $WCl_5$ crystalline phase ("Phase 1"). However, during the vapor deposition and/or etching process, the canister of $WCl_5$ is heated to a temperature of approximately 150° C.

(see, e.g., Example 3 of PCT Pat App Pub WO2017/075172). As shown in Example 3 of the present application, the crystalline percentage of Phase 1 $WCl_5$ drops to approximately 35% after 120 days at 120° C.

Figure 1:
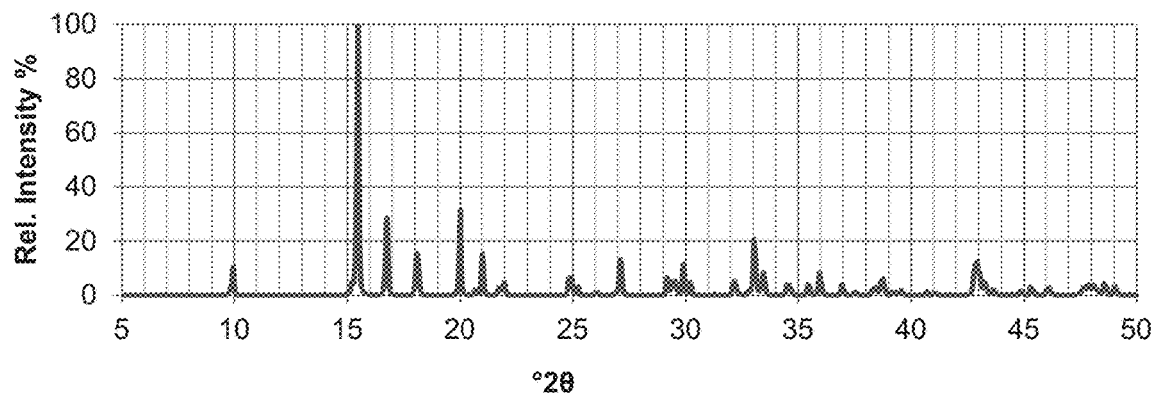
FIG. 1 is an X-Ray Diffraction (XRD) graph of % relative intensity versus the °2θ position of Phase 1 $WCl_5$ (copper radiation)

To Applicant's knowledge, the crystal structure of Phase 1 has not been reported, Phase 1 of $WCl_5$ is monoclinic with space group 12 as C2/m. The unit cell parameters are a=18,11 Å, b=17.72 Å, c=5.809 Å, and β=90.35°. Phase 1 of $WCl_5$ is isostructural to reported compounds $NbCl_5$ (PXRD pattern: ICDD PDF Card #04-0005-4229, for structure see Ref Acta Crystallogr. 1958, 11, pp. 615-.619) and $TaCl_5$ (PXRD pattern: ICDD PDF Card #04-109-4194, for structure see Ref Anorg Allg Chem., 2001, 627, pp. 180-185), The crystal structure for Phase 1 may be generated by modifying the unit cell parameters of $NbCl_5$ or $TaCl_5$ with the above unit cell parameters obtained from PXRD data. The corresponding Nb or Ta atoms are then replaced with W atoms. The simulated PXRD data may be generated using software such as Mercury or CrystDiffract software. FIG. 1 is the simulated PXRD spectrum of Phase 1 generated using the Mercury software.

Figure 2:
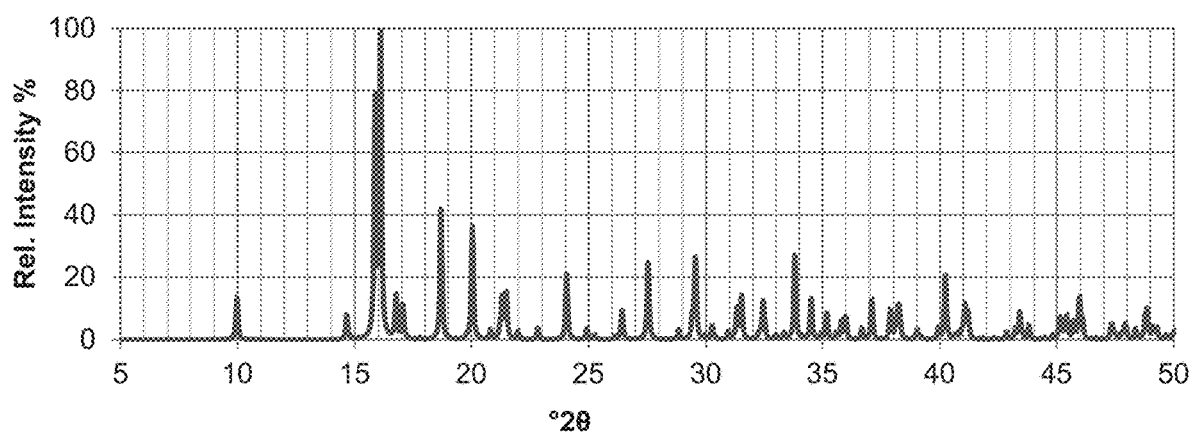
FIG. 2 is an XRD graph of % relative intensity versus the °2θ position of Phase 2 $WCl_5$ (copper radiation)

The PXRD pattern and crystal structure of Phase 2 of $WCl_5$ have been previously reported at ICDD PDF Card #04-005-4302 and Acta Crystallogr. 1978, B34, pp. 2833-2834. Similar to Phase 1, Phase 2 is monoclinic with space group 12 as C2/m. The unit cell parameters are a=17.438(4) Å, b=17,706 Å, c=6,063(1) Å, β=95.51 (2)°, FIG. 2 is the simulated PXRD spectrum of Phase 2 from its crystal structure. The simulated PXRD pattern of FIG. 2 is identical to the one deposited in the ICDD database.

TABLE 1

X Ray Diffraction Simulation Data for Phase 1 and Phase 2 $WCl_5$

| 2 Theta (°) | Phase 1 Relative Intensity % | 2 Theta (°) | Phase 2 Relative Intensity % |
|---|---|---|---|
| 9.956 | 10.61 | 9.983 | 14.41 |
|  |  | 14.666 | 8.11 |
| 15.486 | 100.00 | 15.873 | 78.98 |
|  |  | 16.103 | 100.00 |
| 16.76 | 28.44 | 16.76 | 14.51 |
|  |  | 17.059 | 11.31 |
| 18.062 | 15.36 | 18.862 | 41.84 |
| 20.013 | 31.43 | 20.043 | 35.64 |
| 21.002 | 15.27 | 21.316 | 13.71 |
|  |  | 21.49 | 15.12 |
|  |  | 24.063 | 19.92 |
| 24.952 | 6.82 |  |  |
| 27.119 | 13.19 | 27.532 | 23.52 |
|  |  | 29.55 | 23.62 |
| 30.21 | 4.67 |  |  |
| 33.039 | 20.68 |  |  |
| 33.459 | 8.25 | 33.82 | 27.15 |
|  |  | 40.24 | 20.65 |
| 42.971 | 9.10 |  |  |
|  |  | 45.98 | 13.58 |

In solid state, both crystalline phases contain the dimer of $WCl_5$ (La, $W_2Cl_{10}$). Each tungsten atom is in a pseudo-octahedral geometry connected to four non-shared Cl atoms and two shared Cl atoms. As a result, the phase conversion from Phase 1 to Phase 2 is a diffusionless transformation. In other words, no major reorganization of the crystal structure is observed. In diffusionless transformations, the atoms change their positions slightly in a relatively coordinated manner without interruption of the original bonding (see, e.g., D. A. Porter et al., Phase transformations in metals and alloys, Chapman & Hall, 1992, p. 172). More particularly, phase conversion between Phase 1 and Phase 2 $WCl_5$ mainly involves a change of the β angle of the unit cells, with slight distortions on other unit cell parameters.

Applicants used the external standard method to quantify the percentage of amorphous phase $WCl_5$. All Powder X-Ray Diffraction (PXRD) measurements were performed on either a Rigaku Miniflex diffractometer located in a $N_2$ filled glovebox or a Bruker D8-Advance diffractometer (Cu Kα radiation, λ=1.5406 Å). One of ordinary skill in the art will recognize that the PXRD measurements may also be determined using other anodes, including but not limited to Co, Mo, Cr, Ni, etc. The diffractometer was housed in a nitrogen filled glovebox so that the air-sensitive materials were handled without air/moisture exposure.

PXRD Standard Reference Materials (SRMs, such as NIST-676a, 674b, and 656) that are inert to $WCl_5$ were used for absolute phase concentration quantification with consideration of amorphous, such as $Al_2O_3$, ZnO, $TiO_2$, $CeO_2$, $Cr_2O_3$, $Si_3N_4$, etc. $CeO_2$ (NIST-674b, phase purity is 91.36±0.55%) is preferred because the peaks do not overlap and it provides good PXRD intensity with 5-20% by weight spiking. Samples were received and transferred into the glovebox. Vials containing $CeO_2$ and $WCl_5$ were then opened, and the materials ground into fine powders with an agate mortar and pestle. Known concentrations of $CeO_2$ were mixed with two or more $WCl_5$ samples and the samples are homogenized. The samples were analyzed by PXRD. Standardsample holders were used for Rigaku Miniflex, which X-ray output was 450 W, and the detector was a scintillation counter. The powder patterns were collected using a θ-η scan mode (range 2 θ=8°-50°, step size of 0.02°. Zero background air-tight dome sample holders were used for Bruker D8-Advance diffractometer, which X-ray output is 1600 W. The powder patterns were collected using a θ-θ scan mode (range 2 θ=8°-70°, step size of 0.02°)

The crystalline phases are identified by matching observed peaks to reference patterns in the International Centre for Diffraction Data's 2018 PDF-4+ database of inorganic diffraction data. Phase fractions are determined using the reference crystal structures of the identified phases in the Rietveld Method using MDI-Jade 2010 or Bruker TOPAS 6 software. The concentrations of the SRMs are used to calculate the absolute concentrations of each crystalline phase present in the sample using the following equation:

$$\text{Calc } x_i = \underset{\substack{\text{concentration considered} \\ \text{only crystalline phases}}}{\text{Refined } x_i} \times \frac{\text{known crystalline } x_{CeO_2}}{\text{refined } x_{CeO_2}} \times \frac{\text{mass } CeO_2}{\text{mass sample}}$$

wherein the Refined $x_i$=the concentration of either Phase 1 or Phase 2 of $WCl_5$ as determined by the PXRD data; the known crystalline $x_{CeO_2}$=the $CeO_2$ phase purity or 91.36%, the refined $x_{CeO_2}$=the concentration of $CeO_2$ determined by the PXRD data; the mass $CeO_2$ is the weight of $CeO_2$ in the $CeO_2/WCl_5$ mixture; and the mass sample is the weight of $WCl_5$ in the $CeO_2/WCl_5$ mixture.

The amorphous phase concentration of $WCl_5$ may then be calculated by subtraction of each of the averaged crystalline percentages (i.e., both Phase 1 and Phase 2) using the following equation:

$$\text{Amorphous } x = 100 - \Sigma_{i=1}^{n} x_i$$

Applicants have determined that the purified $WCl_5$ comprises between approximately 50% w/w to approximately 70% w/w of amorphous $WCl_5$, and typically between approximately 55% w/w to approximately 65% w/w.

An percentages of crystalline materials discussed herein are based solely on the crystalline component of the $WCl_5$ and do not include any amorphous $WCl_5$ quantities. In other words, the $WCl_5$-containing composition only comprises 5% w/w of Phase 1 when the $WCl_5$-containing composition comprises 50/50% w/w amorphous/crystalline phases and the crystalline phase has approximately 10% w/w of Phase 1.

As shown in the examples that follow, different methods were used to prepare $WCl_5$ containing different percentages of Phase 1 and Phase 2. The Rietveld method and reference crystal structures of FIGS. 1 and 2 were used to determine the percentage of each crystalline phase in a variety of $WCl_5$ samples. More particularly, the background was determined and removed from each data set. The remaining diffraction peaks were matched to the reference patterns of FIGS. 1 and 2 to determine the phase composition percentage. To be specific, for the Phase 1/Phase 2 $WCl_5$ mixtures, diffraction peaks from the XRD data were matched to reference patterns for Phase 2 $WCl_5$ (PDF #04-005-4302) and $TaCl_5$ (PDF #04-019-4194, isostructural to the unreported Phase 1 $WCl_5$, substitute Ta with W atoms and adjust unit cell parameters to yield the crystal structure of Phase 1 $WCl_5$). The XRD data were then used to determine the relative phase fractions of the two crystalline phases in each sample. The final fits of the calculated diffraction intensities from the refined sample model to the raw XRD data was performed. The computer generated data closely matches the experimental data. Refined phase fractions may be obtained using software, such as MDI-Jade 2010.

Applicants have discovered that the Phase 1 and Phase 2 crystalline phases of $WCl_5$ have different vapor pressures. The % mass loss over 60 minutes at 120° C. for different crystalline phase $WCl_5$ samples was 0.0311% mass loss/minute for 96% Phase 1 $WCl_5$; 0.029% mass loss/minute for 83% Phase 1 $WCl_5$; 0.0261% mass loss minute for 67% Phase 1 $WCl_5$; 0.0248% mass loss/minute for 40% Phase 1 $WCl_5$; 0.0239% mass loss/minute for 39% Phase 1 $WCl_5$; and 0.0223% mass loss/minute for 22% Phase 1 $WCl_5$. The difference between the 0.0311% mass loss/minute for 96% Phase 1 $WCl_5$ versus the 0.0223% mass loss/minute for 22% Phase 1 $WCl_5$ demonstrates the impact that the phase change may have on the vapor supply and accompanying process rate.

Figure 3:
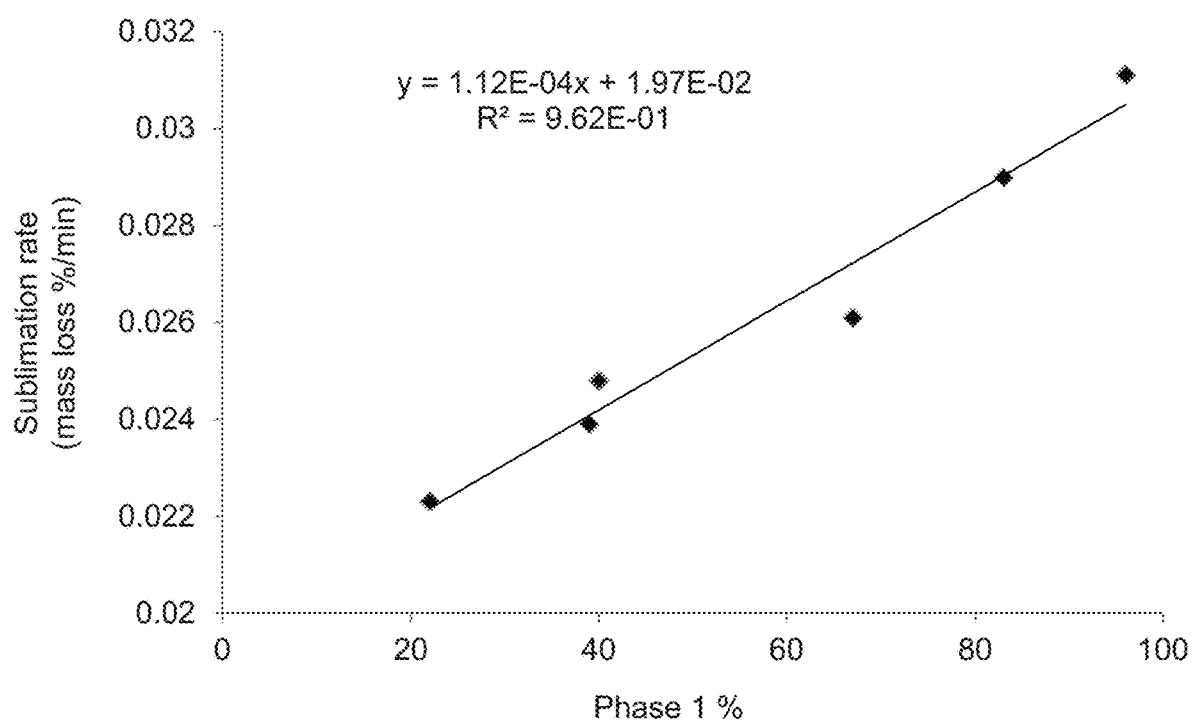
FIG. 3 is a graph of the sublimation rate in mass loss %/minute versus the percentage of Phase 1 $WCl_5$.

FIG. 3 is a graph of the sublimation rate in mass loss %/minute versus the percentage of Phase 1 $WCl_5$. As can be seen, the sublimation rate is linearly proportional to the percentage of crystalline phase material.

Figure 4:
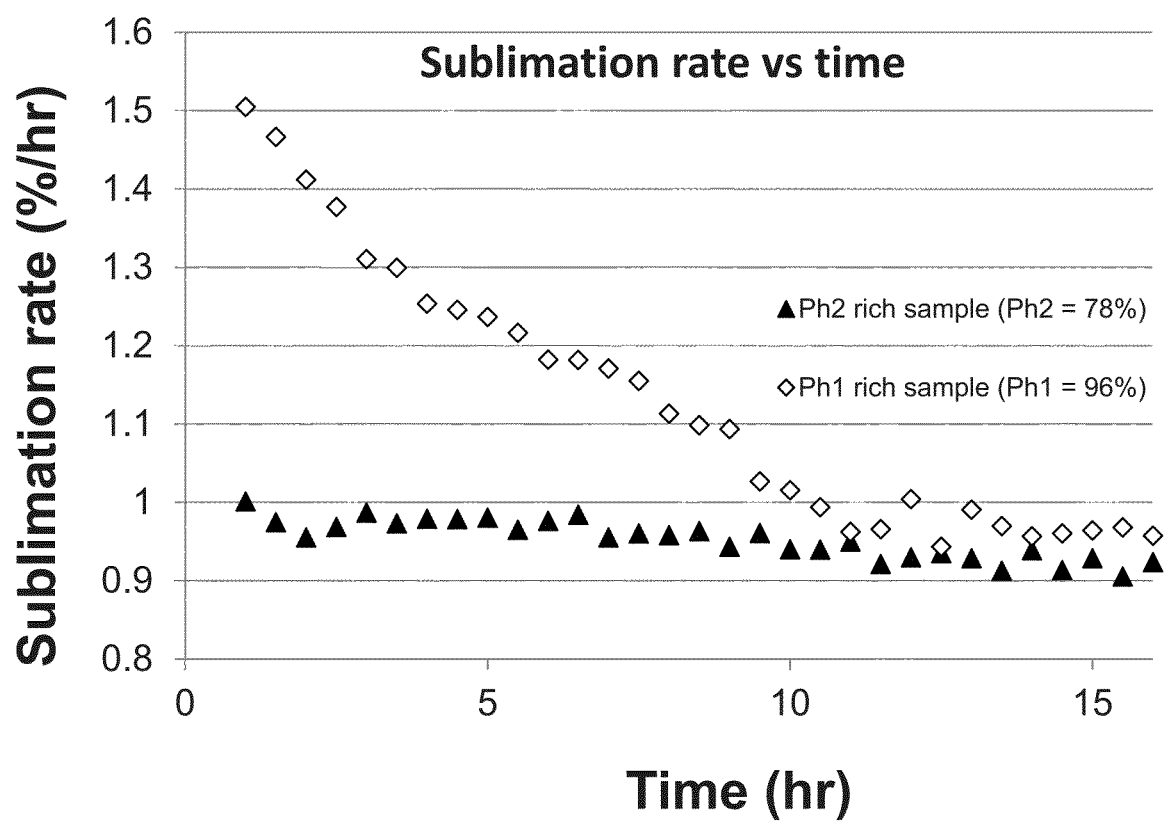
FIG. 4 is a graph showing the sublimation rate (Δ mass/Δ time) versus time for two different crystalline phase $WCl_5$ samples.

FIG. 4 is a graph showing the sublimation rate (Δ mass/Δ time) versus time for two different crystalline phase $WCl_5$ samples. The black triangles show that the sublimation rate for 22% Phase 1/78% Phase 2 $WCl_5$ is linear. This graph shows that the sublimation rate decreases only slightly during 16 hours of sublimation. In contrast, the clear diamonds show that the sublimation rate for 96% Phase 1/4% Phase 2 $WCl_5$ almost immediately begins to rapidly decrease.

As can be seen from FIG. 4, samples containing higher concentrations of Phase 2 have a lower sublimation rate in comparison to samples containing higher concentrations of Phase 1. Therefore, Phase 1 has a higher vapor pressure than Phase 2. Supplying $WCl_5$ that contains a mixture of Phase 1 and Phase 2 crystalline material will cause a vapor pressure drift over time because Phase 1 depletes faster than Phase 2 (i.e., Phase 1 has a higher vapor pressure), even in the absence of any phase conversion. Additionally, as shown in Example 3, Phase 1 converts to Phase 2 during the vapor deposition or etching processes. This conversion further exacerbates the vapor pressure drift.

The difference in vapor pressures and the conversion of the Phase 1 $WCl_5$ to Phase 2 $WCl_5$ during semiconductor processes results in shortened use of the $WCl_5$ materials and the necessity to adjust equipment parameters in order to be able to maintain a stable supply of $WCl_5$ vapors to the vapor deposition tool. Needless to say, adjusting parameters during semiconductor manufacturing is not desired.

To maintain a stable vapor pressure over time, the Phase 1:Phase 2 ratio should be maintained as close to the original phase ratio as possible. Additionally, Applicants have discovered that the Phase 2 material does not convert back to Phase 1 under storage at room temperature or after being heated to temperatures no greater than 247° C. As a result, vapors from Phase 2 $WCl_5$ may be supplied at a variety of temperatures without changing crystallinity phase. Therefore, even though the vapor pressure of Phase 2 is lower than that of Phase 1, a stable supply of the $WCl_5$ vapor may be supplied using higher concentrations of Phase 2 $WCl_5$. The stable supply of $WCl_5$ vapor is beneficial for semiconductor processes, such as vapor deposition or etching. Unfortunately, Applicants have not been able to create 100% Phase 2 $WCl_5$.

As shown in the examples that follow, after sublimation purification, WCk is predominantly Phase 1 material, After purification, $WCl_5$ may be heated to a temperature just below its melting point in order to convert its crystalline phase from predominantly Phase 1 material to predominantly Phase 2 material (i.e., melting point=248° C.). The phase conversion occurs faster at the higher temperatures faster at 240° C. than at 210° C.), The phase conversion also occurs faster in smaller batches, as demonstrated in Examples 5 and 6. As a result, 0.6 kg of $WCl_5$ may be heated from approximately 215° C. to 235° C. for approximately 24 hours to approximately 48 hours or may be heated from approximately 205° C. to 230° C. for a time period ranging from approximately 40 hours to approximately 48 hours. In contrast, sufficient conversion of 1-25 g of $WCl_5$ may occur in 3-6 hours at approximately 210° C. to 230° C. One of ordinary skill in the art will recognize that the maximum time is provided for synthesis efficiency. In other words, conditioning that takes longer than approximately 48 hours is not very commercially viable, Exceeding the 48 hour time frame, however, will not deleteriously affect the resulting phase ratio. In one experiment, there was no difference in phase conversion between a 48 hour sample and a 72 hour sample. Applicants assume that the phase conversion reaches an equilibrium after a certain period of time. For 0.6 kg batches, this equilibrium is reached at approximately 48 hours. One of ordinary skill in the art will recognize that equilibrium may be reached faster or slower depending on batch size.

Applicants have been able to produce crystalline phases of $WCl_5$ compositions containing approximately 10% by weight to approximately 40% by weight of Phase 1 $WCl_5$ as determined by PXRD using a Cu anode, preferably containing approximately 10% by weight to approximately 35% by weight of Phase 1 $WCl_5$, and more preferably containing approximately 10% by weight to approximately 25% by weight of Phase 1 $WCl_5$.

Interestingly, $WCl_5$ maintains a higher percentage of Phase 1 material when it is melted and cooled (i.e., greater than 30% w/w), as shown in Example 4. Similarly, as shown in Example 3, approximately 35% w/w of Phase 1 material remains after consumption over 120 days at 120° C.

The phase conversion that typically occurs during the vapor deposition process (i.e., at temperatures of approximately 150° C.) occurs much slower than the phase conversion that occurs between 190° C. and 245° C. During the vapor deposition process, the vapors of $WCl_5$ are typically generated using a solid precursor vaporizer heated to a temperature of approximately 150° C. See, e.g., WO2017/075172 to L'Air Liquide, Societe Anyonyme pour l'Etude et l'Exploitation des Procedes Georges Claudes. The solid precursor vaporizer is typically a stainless steel vessel, with at least an inlet and an outlet connected to isolation valves. Heating the solid precursor vaporizer to temperatures of 150° C. for an extended period of time in order to convert the material from Phase 1 to Phase 2 may result in corrosion of any stainless steel elements, such as Cr, Fe, Ni, etc. Any corrosion may contaminate the $WCl_5$, resulting in impurities in any W-containing film deposited or any film being etched.

One of ordinary skill in the art will recognize that the any lines connecting the solid precursor vaporizer to the deposition or etching chamber need to be heated in order to maintain the gas phase of the precursor. Failure to do so will result in precipitation of the solid precursor onto the lines. For cost, safety, and maintenance reasons, semiconductor manufacturers prefer to maintain the solid precursor vaporizer and any lines connecting the vaporizer to the processing chamber at lower temperatures (and preferably at room temperature). This, of course, further exacerbates the sublimation issues discussed above (i.e., depletion of the higher vapor pressure Phase 1 material and slow conversion of any remaining Phase 1 material to Phase 2).

Performing the phase conversion in a separate vessel (i.e., not the solid precursor vaporizer) at temperatures ranging from approximately 190° C. to 245° C. enables faster phase conversion than any conversion that occurs during the vapor delivery process. The vessel is chosen to withstand both the material and its properties when heated. The vessel is also chosen to limit the risk of imparting any impurities into the $WCl_5$. Suitable vessels include glass vessels, quartz vessels, glass coated vessels, etc. After the WCk is converted to a majority of Phase 2 material, it may be filled into a $WCl_5$-containing composition delivery device, such as a solid precursor vaporizer, for use in the vapor deposition or etching processes.

Figure 5:
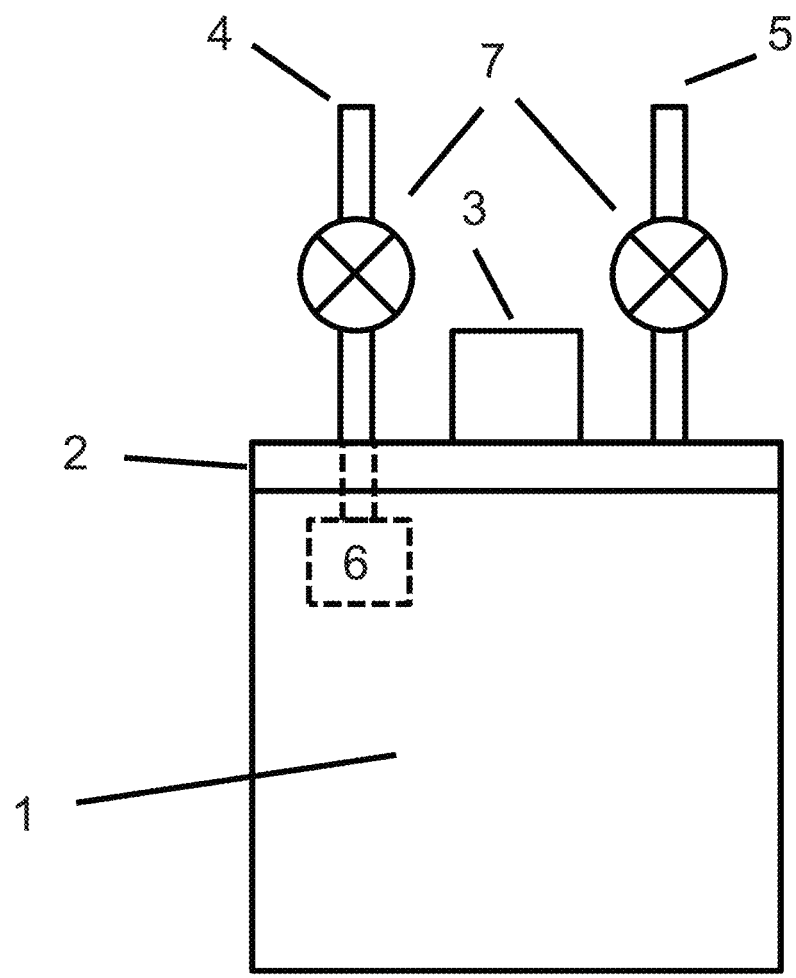
FIG. 5 is a side view of an exemplary $WCl_5$-containing composition delivery device.

FIG. 5 is a side view of an exemplary $WCl_5$-containing composition delivery device, also known as a solid precursor vaporizer. The body 1 of the solid precursor container is made of stainless steel. The container lid 2 may be removable or may be integrated with the body 1. Removable lids 2 may be sealed to body 1 using known sealing mechanisms, such as bolts with metal gasket o-rings or polymer o-rings. The container 1 and lid 2 are leak tight under vacuum (to mtorr) or positive inert gas environment (up to 100 psi) at temperatures ranging from approximately room temperature to approximately 150° C., A fill port 3 permits solid precursors to be added to or removed from the body 1. In certain circumstances, lid 2 may need to be removed to ease removal of the solid materials. Inlet 4 permits a carrier gas to enter the interior of the delivery device. The end 6 of inlet 4 may have different configurations, such as tubing that extends to the bottom of the body 1, tubing that does not extend to the bottom of the body 1 (vapor draw), diffusion plates, baffles, shower-head type fittings, nozzles, etc. Outlet 5 permits the carrier gas and/or vapor phase of the $WCl_5$-containing composition to exit the delivery device. Outlet 5 may also provide a vacuum to the delivery device. Valves 7 are included on the inlet 4 and outlet 5. Valves 7 may be closed when adding or removing solid precursors from body 1. Alternatively, the valve 7 on inlet 4 may be closed and the valve 7 on outlet 5 may be opened when a vacuum provides sufficient vapor pressure of the $WCl_5$-containing composition. Additional valves (not shown) may be utilized without departing from the teachings herein. For example, a valve (not shown) may be located on a connection between the inlet 4 and outlet 5 (not shown) which permits the carrier gas and/or vacuum to bypass the delivery device.

The higher concentration of Phase 2 materials in the resulting $WCl_5$-containing compositions permit stable vapor delivery for vapor deposition or etching processes. The $WCl_5$-containing compositions comprising approximately 10% weight to approximately 40% weight of Phase 1 $WCl_5$ is transferred from the vessel into a solid precursor vaporizer. The solid precursor vaporizer may then be delivered to the semiconductor manufacturing plant. As shown in Example 7, the phase ratio of the conditioned $WCl_5$-containing compositions remains stable at elevated temperatures for extended periods of time. As a result, a delay between conditioning and use in vapor delivery is not detrimental. The solid precursor vaporizer is connected to the semiconductor processing chamber and heated to a temperature to deliver a steady supply of $WCl_5$ vapor. The temperature may range from approximately 100° C. to approximately 150° C. The $WCl_5$-containing compositions may be used in long processes, ranging from approximately 24 hours to approximately 48 hours, or even from approximately 40 hours to approximately 48 hours. Alternatively, the $WCl_5$-containing compositions may be used in short processes ranging from approximately 8 minutes to approximately 24 hours or even ranging from approximately 60 minutes to approximately 8 hours. The $WCl_5$-containing composition maintains approximately 80% w/w of the initial vapor pressure of $WCl_5$ at the vaporizing temperature after approximately 75% w/w of the $WCl_5$-containing composition has been consumed, preferably approximately 90% w/w of the initial vapor pressure, and more preferably approximately 95% w/w of the initial vapor pressure.

EXAMPLES

The following non-limiting examples are provided to further illustrate embodiments of the invention. However, the examples are not intended to be all inclusive and are not intended to limit the scope of the inventions described herein.

Example 1

Vacuum Sublimation Purification

Equipment: Glass sublimator purification set (Bottom part, cold finger, O-ring, clamp, chiller)

Crude $WCl_5$ was added to the bottom of the glass sublimator purification set.

The sublirnator was then placed into the heating mantle and properly assembled. The chiller was maintained at the coolant temperature of approximately 6° C. to approximately 25° C. The heating mantle was maintained at approximately 200° C. to approximately 220° C. After heating under vacuum, the heating mantle is turned off and allowed to cool. The sublimator set was carefully disassembled and the materials condensed on the cold finger are then collected. Samples are submitted for XRD analysis to quantify crystalline phases.

This process is similar to that disclosed in WO2017/130745 to Nippon Mining & Metals Corp, in which the sublimate is recovered by air cooling or water cooling, Applicants believe that Phase 1 $WCl_5$ forms on the cool surface of the cold finger or other chilled surface.

TABLE 2

| Batch | Ph1 (%) | Ph2 (%) |
|---|---|---|
| Batch 1 | 97 | 3 |
| Batch 2 | 98 | 2 |
| Batch 3 | 96 | 4 |
| Batch 4 | 97 | 3 |
| Batch 5 | 95 | 5 |
| Batch 6 | 92 | 8 |
| Batch 7 | 94 | 6 |
| Batch 8 | 95 | 5 |

Example 2

Carrier Gas Assisted Sublimation Purification

Crude $WCl_5$ was loaded to the coated stainless steel bottom kettle of a sublimation purification system. A lid was secured to the kettle with a clamp. A heating mantle was placed on the lid. One KF 40 joint of stainless steel tubing was connected to the lid with a KF 40 Kalrez gasket and secured with a clamp. A separate KF 40 joint of stainless steel tubing was connected to the inlet port of the lid. A vacuum line was connected to the outlet port of the lid. A $N_2$ carrier gas line was connected to the sublimator's purging port.

After a leak test of the system, the temperature controllers were set to:

Bottom: 210+/−10° C.

Lid: 220+/−10° C.

Transfer tubing: 230+/−10° C.

Receiving pot lid: 240+/−10° C.

$N_2$ flow: 100+/−10° C.

The flow meter for $N_2$ was set to 0.200 L/min, After heating, the heating mantles were turned off. The sublimator was cooled below 80° C. and then flow of the carrier gas $N_2$ was stopped. The receiving pot is carefully disassembled and solid materials collected, Samples are submitted for XRD analysis to quantify crystalline phases.

TABLE 3

| Batch | Ph1 (%) | Ph2 (%) |
|---|---|---|
| Batch 1 | 68 | 32 |
| Batch 2 | 56 | 44 |
| Batch 3 | 83 | 17 |
| Batch 4 | 57 | 43 |
| Batch 5 | 69 | 31 |
| Batch 6 | 89 | 11 |
| Batch 7 | 71 | 29 |
| Batch 8 | 62 | 38 |

As can be seen, this process produces less Phase 1 $WCl_5$ than the process of Example 1. Applicants believe that the cooling temperatures affect the crystallinity of the final $WCl_5$ product. In other words, Applicants believe that cooler temperatures produce more Phase $WCl_5$. The condensing temperature of Example 2 is higher than that of Example 1 because no external cooling source was used. Therefore, the percentage of Phase 1 material is higher in Example 1 than Example 2.

Example 3

In Situ Phase Change

Freshly purified $WCl_5$ is added to a solid precursor delivery device and maintained at a temperature of approximately 120° C. As shown in Example 1, such $WCl_5$ contains greater than 90% Phase 1 $WCl_5$. Table 4 demonstrates that the percentage of Phase 1 material decreases due to the vapor deposition or etching processing conditions. More particularly, after more than 50% of the material has been consumed during the vapor deposition or etching process, only 35-51% of Phase 1 $WCl_5$ remains. However, $WCl_5$ containing less than 35% Phase 1 $WCl_5$ has not been produced during the vapor deposition process. Applicants believe that standard sublimation conditions are not sufficient to produce high quantities of Phase 2 $WCl_5$.

TABLE 4

| Batch | Initial Weight (g) | Final Weight (g) | % (w/w) Consumed | % Phase 1 Remaining | % Phase 2 Remaining |
|---|---|---|---|---|---|
| 1 | 402 | 109 | 73 | 35 | 65 |
| 2 | 404 | 146 | 64 | 40 | 60 |
| 3 | 400 | 168 | 58 | 49 | 51 |
| 4 | 400 | 171 | 57 | 51 | 49 |

Example 4

Melting

In a glovebox, 15 grams of freshly purified $WCl_5$ produced by the method of Example 2 (with 71% P1 and 29% P2) was added to a 100 mL heavy wall glass pressure vessel. The pressure vessel was sealed and removed from the glovebox. The bottom of the pressure vessel was submerged in a pre-heated sand bath at 260° C. in order to heat $WCl_5$ above its melting point (i.e., 248° C.). Once the solid $WCl_5$ completely melted, the material was heated for another 5 minutes, followed by cooling under different conditions. The pressure vessel was brought back into the glovebox.

The $WCl_5$ product was collected and submitted for XRD analysis to quantify crystalline phases.

TABLE 5

| Sample | Condition | Ph1 (%) | Ph2 (%) |
|---|---|---|---|
| W-FG1717 | Starting Materials | 71 | 29 |
| 18-001-D | Rapid cooling (remove from heat bath to allow rapid cooling to RT) | 38 | 62 |
| 18-003-A | Slow cooling to 190 C. for 1 hr (leave in 190 C. bath for 1 hr to allow slow cooling; then remove to allow rapid cooling to RT) | 32 | 68 |

As can be seen, melting and cooling, whether quickly or more slowly, produces Phase 1=30-40%; Phase 2=70-60%.

Example 5

Small Scale Conditioning

In a glovebox, 15 grams of freshly purified $WCl_5$ solids produced by the method of Example 2 (with 71% Ph1 and 29% Ph2) was added to a 100 mL heavy wall glass pressure vessel. The pressure vessel was sealed and removed from the glovebox. The bottom of the pressure vessel was submerged in a pre-heated sand bath at 190° C. or 220° C. for a period of time. The pressure vessel was then removed from the sand bath and allowed to cool to room temperature for a period of 30 minutes. A big shiny cake was observed and it could be easily broken into shining crystalline powders by shaking the pressure vessel. The pressure vessel was brought back into the glovebox. Product was collected and submitted for XRD analysis to quantify crystalline phases.

TABLE 6

| Sample | Temp. (° C.) | Time (hr) | Ph1 (%) | Ph2 (%) |
|---|---|---|---|---|
| W-FG1717 (Starting Materials) | | | 71 | 29 |
| 18-001-A | 190 | 1 | 49 | 51 |
| 18-003-C | | 3 | 37 | 63 |
| 18-003-B | 220 | 3 | 22 | 78 |
| 18-004-A | | 6 | 16 | 84 |

The samples having 16% and 22% Phase 1 $WCl_5$ would be suitable to provide a stable vapor supply of $WCl_5$ vapor during vapor deposition or etching processes.

Example 6

Large Scale Conditioning

Figure 6:
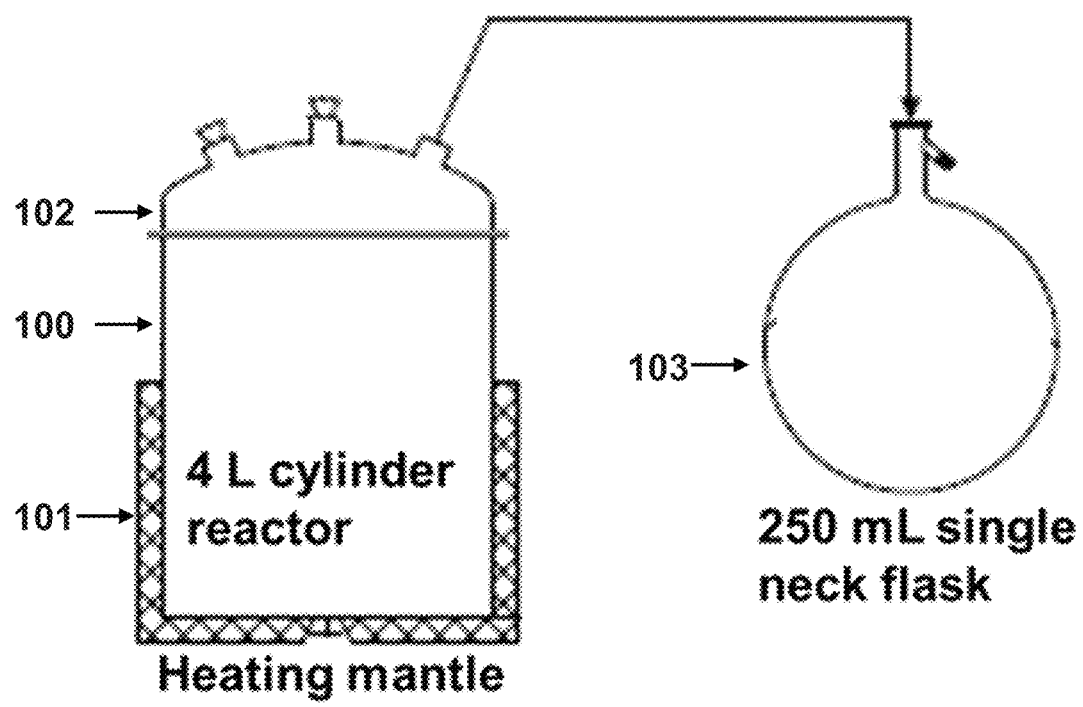
FIG. 6 is a schematic diagram of exemplary equipment in which Example 6 was performed.

FIG. 6 is a schematic diagram of the exemplary equipment in which this example was performed. One of ordinary skill in the art will recognize that the diagram is not to scale (i.e., the 250 mL flask is NOT the same size as the 4 L cylinder reactor). One of ordinary skill in the art will further recognize the sources for the equipment. Some level of customization of the components may be required based upon the desired temperature range, pressure range, local regulations, etc.

In a glovebox, 600±100 grams of freshly purified $WCl_5$ produced by the method of Example 2 (with 17-44% weight Phase 2) was added to a 4 L heavy wall glass cylinder reactor 100. The lid 102 was sealed and secured to the reactor 100. A security flask 103 was connected to the lid 102 for safety purposes. More particularly, the security flask 103 captures any $WCl_5$ that may escape the reactor 100 due to overheating or other safety issues. The reactor 100 was heated at 230° C. for a period of 44 (+/−4) hrs using heating mantle 101. The temperature controller (not shown) was turned off and the reactor 100 was allowed to slowly cool to below 100° C. inside the heating mantle 101. The reactor 100 was then removed from the heating mantle 101. The lid 102 is disassembled and the big shiny black cake on the bottom of the reactor 100 was poured into the glass mortar. Crystalline powders were obtained by roughly grinding with glass mortar and pestle. Product was collected and submitted for XRD analysis to quantify crystalline phases. Table 7 demonstrates that this process repeatedly yields product having approximately 70% weight of Phase 2 material.

TABLE 7

| Batch | Phase 1 (weight %) | Phase 2 (weight %) |
|---|---|---|
| 1 | 28 | 72 |
| 2 | 28 | 72 |
| 3 | 29 | 71 |
| 4 | 28 | 72 |
| 5 | 30 | 70 |

TABLE 7-continued

| Batch | Phase 1 (weight %) | Phase 2 (weight %) |
|---|---|---|
| 6 | 31 | 69 |
| 7 | 31 | 69 |
| 8 | 30 | 70 |

These materials would be suitable to provide a stable vapor supply of $WCl_5$ vapor during a vapor deposition or etching processes.

Example 7

Stability Testing 400 g of 69% w/w Phase 2 material was heated to approximately 120° C. under vacuum for more than five weeks. During the process, $N_2$ was introduced as a carrier flow gas. As a result, 220 g of $WCl_5$ was removed and 180 g of 73% w/w Phase 2 material remained in the canister. This experiment demonstrates that the phase 2 rich composition remains very stable, even after greater than 50% w/w of the material is removed under intended consumption conditions (i.e., 400 g-220 g/400 g*100%=45% w/w).

Based on data obtained from FIGS. 3 and 4, Phase 1 is at least approximately 75% more volatile than Phase 2. Thus, a phase composition change of 4% w/w (from 69% w/w to 73% w/w Phase 2) would only have a vapor pressure decay of approximately 2% Pa/Pa.

The vapor pressure decay may be calculated using a slope similar to that of FIG. 3 (i.e., y=1.12 E-04x+1,97 E-02, with x being the abscissa which is the % of Phase 1 material). One of ordinary skill in the art will recognize that vapor pressure and sublimation rate correlate linearly. As a result, the vapor pressure/sublimation rate of the starting material is y1=a*x1+b and the vapor pressure/sublimation rate of the ending material is y2=a*x2+b, with a=1.12 E-04 and b=1,97 E-02 in FIG. 3. The formula for the percent change in vapor pressure is therefore (y2−y1)/y1*100%=a(x2−x1)/(a*x1+b), or 1.9% w/w, Such materials with this stable phase composition overtime provide stable $WCl_5$ vapor supply.

While embodiments of this invention have been shown and described, modifications thereof can be made by one skilled in the art without departing from the spirit or teaching of this invention. The embodiments described herein are exemplary only and not limiting. Many variations and modifications of the composition and method are possible and within the scope of the invention. Accordingly, the scope of protection is not limited to the embodiments described herein, but is only limited by the claims which follow, the scope of which shall include all equivalents of the subject matter of the claims.

We claim:
1. A $WCl_5$-containing composition comprising a crystalline phase having approximately 10% weight to approximately 40% weight of phase 1 $WCl_5$ as determined by X-ray diffraction.
2. The $WCl_5$-containing composition of claim 1, the crystalline phase having approximately 10% weight to approximately 35% weight of Phase 1 $WCl_5$.
3. The $WCl_5$-containing composition of claim 1, the crystalline phase having approximately 10% weight to approximately 30% weight of Phase 1 $WCl_5$.

4. The WCl$_5$-containing composition of claim 1, the crystalline phase having approximately 10% weight to approximately 25% weight of Phase 1 WCl$_5$.

\* \* \* \* \*